United States Patent [19]

DiMarcello et al.

[11] Patent Number: 5,233,200
[45] Date of Patent: Aug. 3, 1993

[54] METHOD AND APPARATUS FOR CONTACTLESS MONITORING OF TENSION IN A MOVING FIBER

[75] Inventors: Frank V. DiMarcello, Annandale; Arthur C. Hart, Jr., Chester; Richard G. Huff, Basking Ridge; Kenneth L. Walker, New Providence, all of N.J.

[73] Assignee: AT&T Bell Laboratories, Murray Hill, N.J.

[21] Appl. No.: 812,671

[22] Filed: Dec. 23, 1991

[51] Int. Cl.$^5$ .............................................. G01V 9/04
[52] U.S. Cl. .................................... 250/561; 356/73.1
[58] Field of Search ............................ 250/561, 231.1; 356/73.1; 73/862.39, 862.41

[56] References Cited

U.S. PATENT DOCUMENTS

| | | | |
|---|---|---|---|
| 4,692,615 | 9/1987 | Mensah | 250/231.1 |
| 5,079,433 | 1/1992 | Smith | 250/561 |
| 5,113,708 | 5/1992 | Bode et al. | 73/862.41 |
| 5,130,557 | 7/1992 | Kettl | 250/561 |

OTHER PUBLICATIONS

DiMarcello, et al. "Fiber Drawings and Strength Properties", *Optical Fiber Communications*, vol. 1, pp. 179-248, T. Li, ed., Academic Press, Inc., 1985.
Askins et al. "Noncontact Measurement of Optical Fiber Draw Tension", *Journal of Lightwave Tech.*, vol. 9, No. 8, pp. 945-947, (1991).

*Primary Examiner*—David C. Nelms
*Assistant Examiner*—Que T. Le
*Attorney, Agent, or Firm*—Oleg E. Alber

[57] ABSTRACT

This invention is a process of contactless monitoring the tension in a moving fiber, such as during the process of drawing optical fibers from preforms, and a non-contacting tension gauge which allows measurement of fiber tension at line speed. The device can be used to monitor the tension during the run without any adverse effects on fiber performance. The measurement may be steady, intermittent or sinusoidal as appropriate. The process includes the steps of sensing an initial position of a moving optical fiber, applying a gas jet onto a section of the optical fiber in a direction transverse to the direction of movement of the fiber so as to cause deflection of the moving fiber axially of the gas jet, sensing the magnitude of deflection of the fiber relative to the said initial position, and, depending on the magnitude of deflection, adjusting the tension in the fiber so as to cause the change in the magnitude of deflection to a preselected value. The monitoring is especially suitable for monitoring the tension in an optical fiber being drawn from a heated preform, the tension being adjusted by adjusting the temperature of the fiber-drawing furnace.

18 Claims, 4 Drawing Sheets

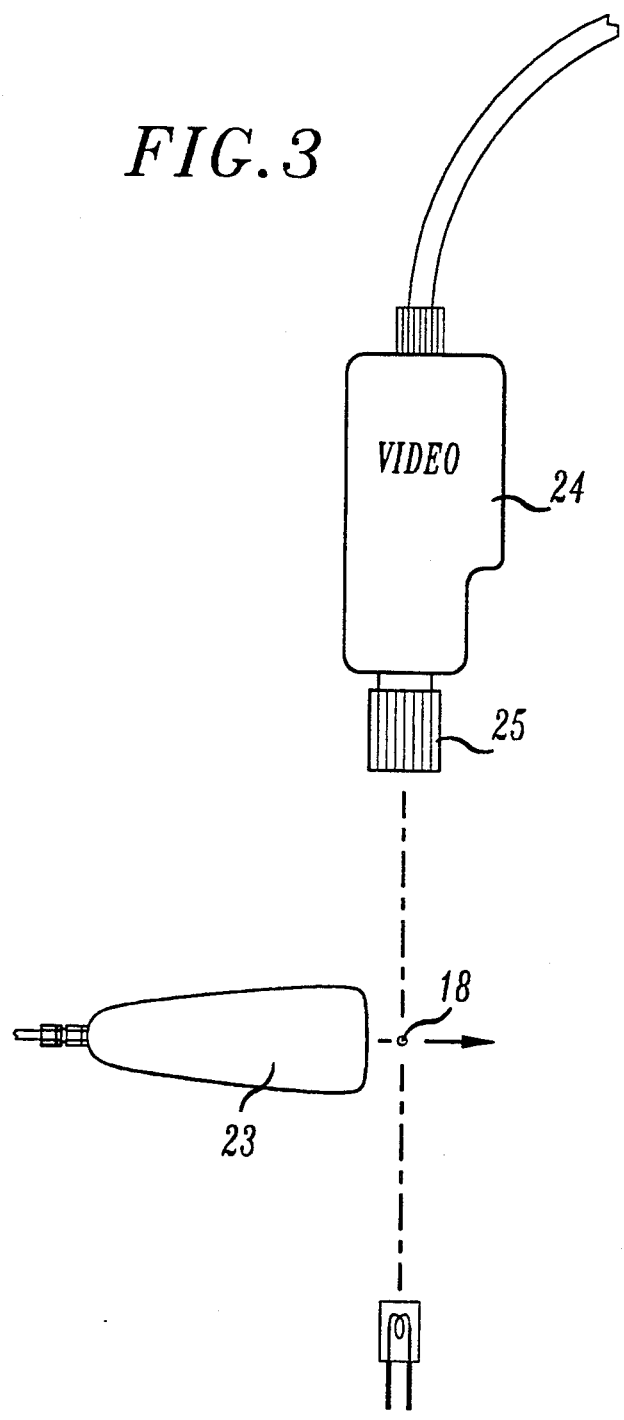
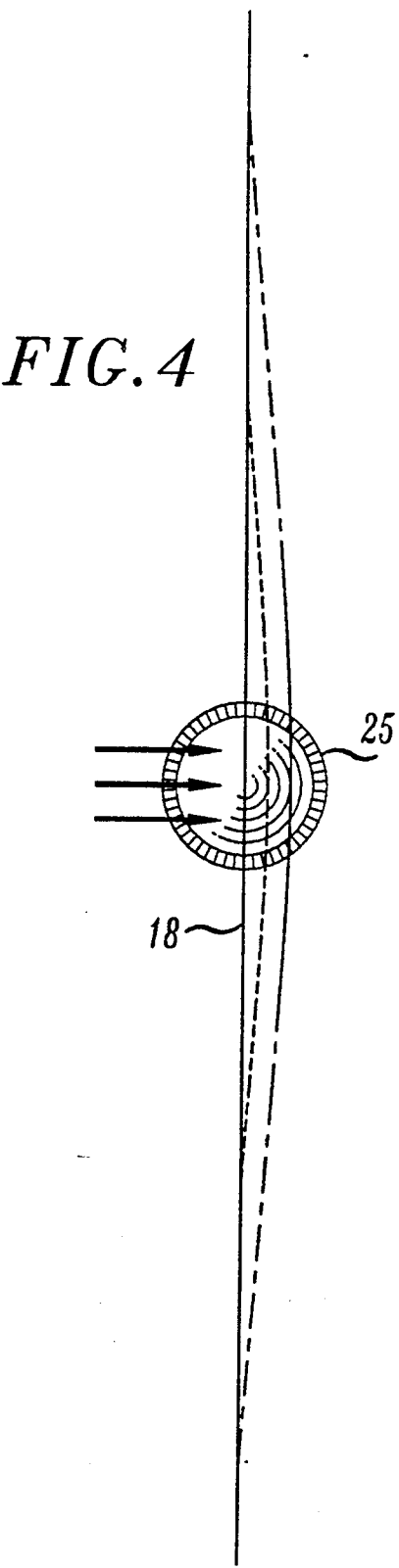

METHOD AND APPARATUS FOR CONTACTLESS MONITORING OF TENSION IN A MOVING FIBER

FIELD OF THE INVENTION

This invention is concerned with fabrication of optical fibers and especially with contactless monitoring of tension in a moving fiber being drawn from a heated glass preform.

BACKGROUND OF THE INVENTION

The fabrication of optical fibers includes heating at least an end portion of an optical fiber glass preform within a fiber drawing furnace and drawing a thin glass fiber from an end portion of the preform. The drawn fiber then may be subjected to at least one coating, such as at least one polymer coating. For example, the procedure described by F. V. DiMarcello, C. R. Kurkjian and J. C. Williams, "Fiber Drawings and Strength Properties" in *Optical Fiber Communications*, Vol. 1, pp. 179-248, T. Li, ed., Academic Press, Inc., 1985, may be utilized to draw the fiber from a preform.

A critical parameter in the production of optical waveguide fibers is the tension within the fiber during the drawing process, and, in particular, the tension in the region between the hot zone inside the fiber drawing furnace and the first fiber coating. The magnitude of this tension affects the final properties of the fiber including the fiber's diameter, ultimate strength and its optical properties.

The temperature of the fiber preform is typically not monitored while inside the fiber drawing furnace. In lieu of this measurement, the temperature of the furnace wall is monitored, and is typically held constant by feedback loops. The temperature of the fiber as it is drawn from the preform is determined by the furnace temperature and also by the gas flow through the furnace. This gas flow is due to injected gases in the case of a graphite furnace or upward convection as the heated gases rise in a zirconia furnace. Typically, this flow is controlled by restrictions which can be placed at either end of the furnace, which limit the gas flow through the furnace. The difficulty associated with accurately duplicating the restriction from preform to preform, along with the errors associated with the siting of the pyrometer of the furnace tube, forces an additional measurement of fiber temperature. This is typically accomplished indirectly by measuring the tension required to draw the fiber. In fact, the tension, not fiber temperature, is usually specified as the parameter to be controlled in fiber drawing. Typically, this tension is measured using a 3-wheel strain gauge which contacts the fiber during the start-up of the fiber drawing procedure. Here, two wheels are applied to one side of the fiber and a third wheel is applied to the other side of the fiber. Unfortunately, the tension is very difficult to measure at high line speeds, e.g., 5 m/s and above, since damage imparted to the fiber by the strain gauge wheels causes the fiber to break. At lower line speeds, such as below 3 m/s, the tension of the fiber is lower and allows the fiber to survive the measurement. While fiber tension varies linearly with draw speed and should allow an accurate determination of fiber tension on basis of the low speed readings, any errors in setting the tension at low speeds are magnified by the ratio of the final line speed compared to the measured speed. This problem is addressed by predicting draw tension from a measurement at a lower speed. To confirm predictions and to detect variability during drawing, the fiber tension at the line speed of interest should also be measured. Therefore, a non-contacting measurement is required if the tension is to be measured at high line speeds while avoiding the severe damage that the 3-wheel strain gauge imparts to the fiber at higher line speeds.

One example of a prior art contactless measurement of the draw tension is disclosed in U.S. Pat. No. 4,692,615 issued to Thomas O. Mensah et al. on Sep. 8, 1987. The tension in a moving fiber is monitored by sensing a vibrational motion of the fiber in a direction transverse to the direction in which the fiber is moving, analyzing the vibrational motion by Fourier transform analysis to determine at least one frequency component thereof, and monitoring the determined frequency component so as to monitor the tension in the fiber. However, measuring the frequency response of the fiber to either vibrations within the fiber due to the drawing process or to an intentional perturbation of the fiber position by puffs of air has certain disadvantages. Vibrations in the fiber can be caused by building and apparatus vibrations, preform feed motor instabilities, fiber drawing motor instabilities, polymer coating application instabilities, to mention a few. While some of these vibrations, such as building vibrations, would remain constant in frequency and, therefore, are relatively easy to identify, sources such as motor noises would increase in frequency with draw speed and would be much more difficult to isolate from the fundamental fiber vibration. Also, quick puffs of air which are used to cause additional vibrations of the fiber can cause fiber diameter feedback loops to become unstable and result in fiber diameter excursions.

Another example of prior art contactless measurement is disclosed by C. G. Askins et al. in "Noncontact Measurement of Optical Fiber Draw Tension", *Journal of Lightwave Technology*, Vol. 9, No. 8, August 1991, pages 945-947. This technique utilizes analysis of fundamental resonant frequency of the length of fiber between the neckdown region in the furnace and the polymer coating die (station) to determine the tension in the fiber. This technique is subject to disadvantages similar to those in the Thomas Mensah patent, except for the recognition of the existence of frequency components attributed to other sources, and cognizant increase in the fundamental frequency of oscillation of the fiber and reduction of the effects of the other frequency components by means of puffs of nitrogen gas. The process could be useful for known and stable other vibrations but could become difficult if these vibrations are variable or a new set of vibrations is present.

Therefore, a much simpler contactless tension monitoring is needed.

SUMMARY OF THE INVENTION

This invention is a process of contactless monitoring the tension in a moving fiber, such as during the process of drawing optical fibers from preforms, and a non-contacting tension gauge which allows measurement of fiber tension at line speed. The device can be used to monitor the tension during the run without any adverse effects on fiber performance. The measurement may be steady, intermittent or sinusoidal as appropriate.

The process includes the steps of sensing an initial position of a moving optical fiber, applying a gas jet onto a section of the optical fiber in a direction transverse to the direction of movement of the fiber so as to cause deflection of the moving fiber axially of the gas jet, sensing the magnitude of deflection of the fiber relative to the said initial position, and, depending on the magnitude of deflection, adjusting the tension in the fiber so as to cause the change in the magnitude of deflection to a preselected value. The monitoring is especially suitable for monitoring the tension in an optical fiber being drawn from a heated preform, the tension being adjusted by adjusting the temperature of the fiber drawing furnace.

BRIEF DESCRIPTION OF THE DRAWINGS

FIG. 3 is a top view, as seen in the direction of movement of the fiber, of an arrangement of the nozzle, video camera and light source used in monitoring the fiber tension;

FIG. 4 is a schematic representation showing original undeflected fiber path (solid line) and deflected paths of the fiber relative to the undeflected fiber path and to a central scan line of the lens;

DETAILED DESCRIPTION

Figure 1:
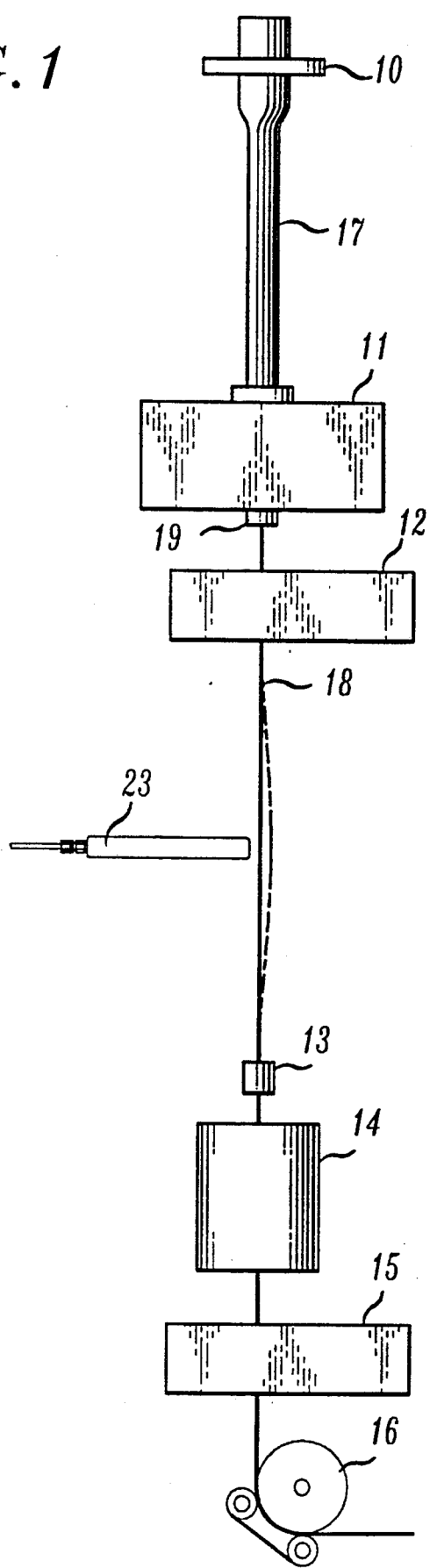
FIG. 1 is a schematic illustration of a conventional fiber-drawing and coating apparatus which includes an air-jet nozzle of the present invention.

FIG. 1 is a schematically illustrated simplified representation of a typical optical fiber draw tower. The draw tower includes a preform feed mechanism, 10; a draw furnace, 11; a monitor for measuring fiber diameter, 12; a polymer coating die, 13; a curing station, 14; a polymer coating diameter monitor, 15; and a capstan and take-up mechanism, 16. These components are conventional and have been described in F. V. DiMarcello et al., supra.

In a start-up of a drawing operation, one end of a fiber preform, 17, is secured in preform feed mechanism 10 and the other end is inserted into draw furnace, 11. The draw furnace is heated to a temperature of approximately 2300° C. After an initial preform preheating period, a drawing of a fiber, 18, is initiated, and, after a path is completed from fiber preform 17 to the take-up mechanism, a drawing of the fiber, first at low (e.g. 1 to 2 m/s) and then at higher line speeds (e.g. 5 m/s or higher) is maintained.

In accordance with the present invention, the fiber tension is measured by determining an initial vertical position of a central portion of a length of a fiber moving at a certain line speed along a substantially vertical path, applying a gas jet to the moving fiber transversely of said central portion of the fiber, so as to cause deflection of the fiber relative to the initial position, optically measuring the magnitude of deflection of the fiber from the initial position, and determining the tension in the fiber on basis of the magnitude of the deflection. The gas jet applied from a nozzle, 23, impinges on the fiber, transversely thereof, about centrally between the exit, 19, from furnace 11 and the entrance to polymer coating station 13. For a given fiber diameter, gas flow, gas jet configuration, and position on the tower, the deflection will be inversely related to the tension by the simple relationship: $T = k/d$, wherein T is tension, k is an empirically determined constant and d is deflection. The measurement may be intermittent, that is, the steps of determining the initial position of the fiber, applying the gas jet, including the ramping, determining the deflection and adjusting the tension, if needed, are conducted at intervals which could be regular or irregular at the discretion of an operator or under computer control. Alternatively, the gas jet may be applied sinusoidally during the drawing operation, with gas jet velocities varying between a zero or some other initial position and a gas velocity selected for a desired line speed.

Figure 2:
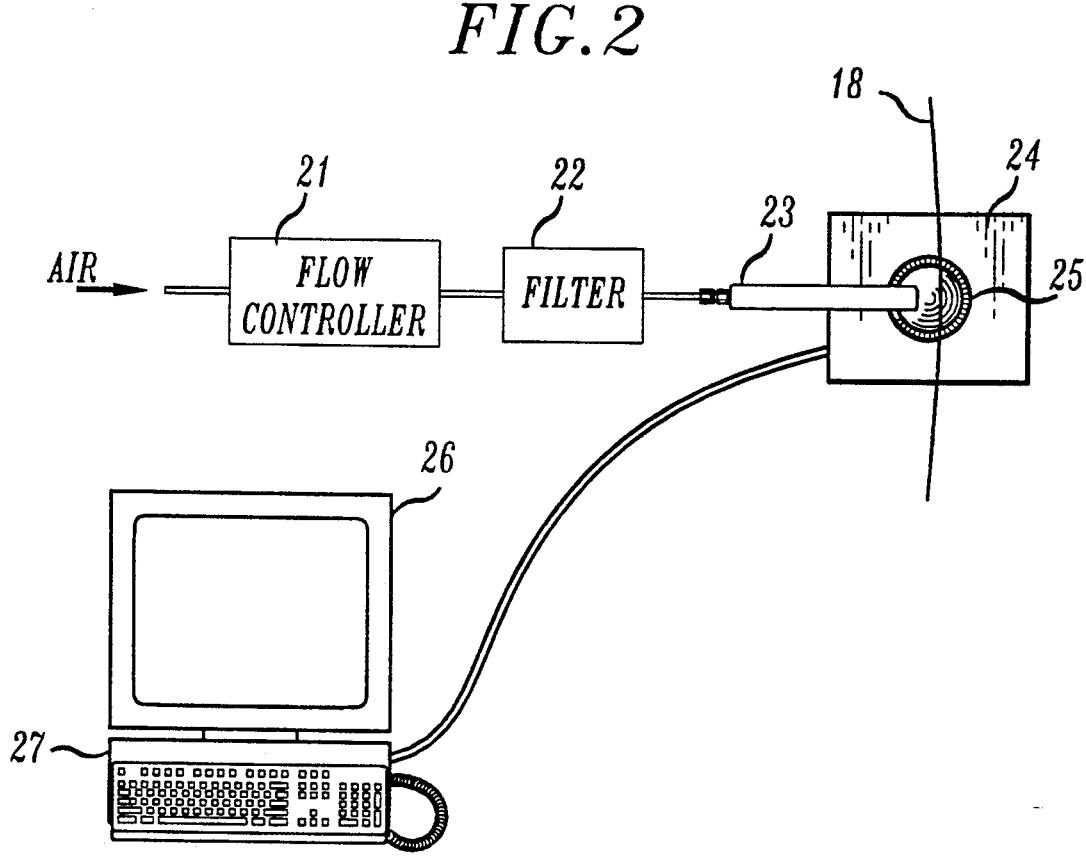
FIG. 2 is a schematic illustration of the tension measuring arrangement according to the invention.
Figure 5A:
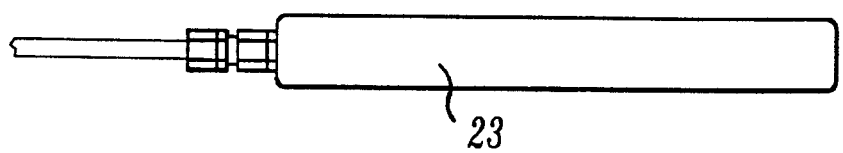
FIGS. 5A and 5B are schematic representations of a side and a top view of an air jet nozzle for use according to the invention.
Figure 5B:
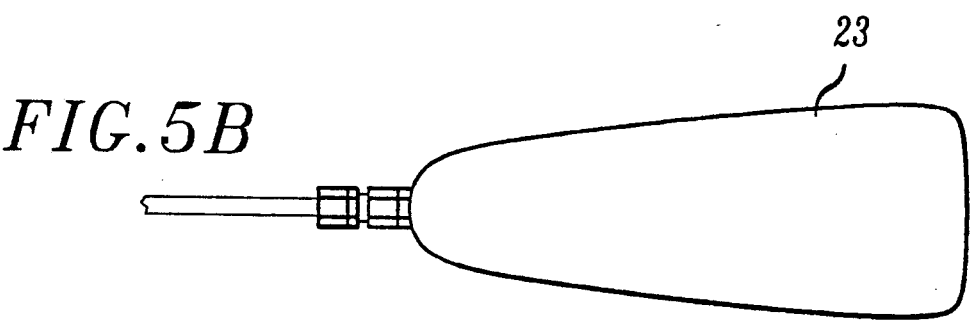

The tension measuring arrangement is shown in FIG. 2. In operation, gas, such as chosen from air, helium, nitrogen, etc., is supplied from a source of gas (not shown) to a flow controller, 21. The gas then passes through a gas filter, 22, to nozzle 23, from which it emerges at gas velocities ranging from 4 m/s to 100 m/s, preferably at 20 m/s in the form of a broad jet of gas which is directed onto fiber 18. A Matheson 6134 gas filter which is rated as being 100% efficient in removing particles greater than 0.2 micrometers is used for the gas filtering. Other gas filters with the same or greater efficiency may be used. In order to minimize any perturbations in the draw process, the flow of gas is ramped by the flow controller to a maximum desired gas velocity over a short initial period, such as 5 to 15 seconds, preferably 10 seconds. The initial application of the gas jet is conducted in a gentle manner such that the fiber position change is gradual to avoid disrupting the fiber drawing process. Further application is conducted in a steady manner. Use of quick puffs of air, suggested by Mensah to cause fiber vibrations are to be avoided. They can cause fiber diameter feedback loops to become unstable and result in fiber diameter excursions.

The size of the cross-section of the nozzle is selected so as to apply the gas jet over a section of the fiber ranging from 0.10 inch to 1 inch or more in length. The width of the nozzle is selected to be large relative to the thickness of the fiber so as to minimize any errors associated with fiber position variation. Cross-section of the nozzle ranging from 0.1 to 2 square inches is useful, with from 0.1 to 1 square inch being preferable, and with about 0.125 square inches being most preferable. In the exemplary embodiment, nozzle 23, shown in FIGS. 2, 3, 5A and 5B, is a modification of a microwave tubing approximately 0.125"×1" in cross-section and about 3–4 inches long. This configuration delivers a broad jet of gas with a very uniform gas velocity across its face minimizing any errors that would be associated with fiber position variations. Other variants of the nozzle may be used with different configurations of the orifice, such as circular, oval, etc., from which the gas impinges onto the fiber.

The flow of the gas jet emanating from nozzle, 23, causes deflection of the fiber from the normal, undeflected path (an initial position) to a deflected position, as is shown in FIG. 4 by a solid line for the undeflected fiber and by dash and dash-dot lines for two different deflection magnitudes. The magnitude of deviation of the fiber at said central position from a normal vertical draw position is then determined and correlated to a tension in the fiber. The flow of gas is adjusted to cause a certain deflection of the fiber from the undeflected fiber path. The magnitude of the deflection is limited not to exceed a certain value to minimize any possible negative effect on either the coating concentricity or the fiber diameter control. Deflections of 2 mm had no noticeable effect on fiber diameter measurement monitor 12 or the coating concentricity, but did cause a change in the position of the fiber as it entered polymer coating die 13. Deflections of 1 mm did not have any of such a negative effect. Therefore, the deflections should be kept below 2 mm, preferably at 1.5 mm, most preferably at 1 mm or less relative to the undeflected position. These deflection values are for a fiber span distance of 15 to 25 feet between the end of the preform (neckdown position) from which the fiber is drawn and the polymer coating die 13. For some other distances between these points, some other maximum and optimum magnitude of deflection, may be determined by a simple trial-and-error technique.

Measurement of the deflection and adjustment of the furnace temperature may be accomplished in a suitable manner including observations by an operator. One convenient way is by using a microscaler, such as Colorado model 305, in which a CCTV camera is directed at the fiber in a position transverse to both the direction of movement of the fiber and to the direction of the gas stream, preferably at approximately 90° to each direction. The operator, after detecting on a screen of a monitor 26, the deflection from a scan line which represent a normal (initial) fiber position prior to the application of the gas stream to the fiber, causes adjustment of the temperature of the draw furnace, thus indirectly affecting the tension in the fiber, so that the fiber moves to a position corresponding to a desired fiber tension and, thus, preform temperature. The adjustments may be conducted by the operator manually or automatically via a computer controller, 27.

A convenient way of detection is by illumination of the fiber and sensing the position of the shadow of the fiber on a diode array, such as Reticon 75-RC-103. Various light sources may be used, including incandescent bulb and laser, the latter being especially useful when using the diode array. Another way is to use a CCTV camera, 24, with a 4× objective lens, 25, which is oriented so that the line scans run parallel to the fiber line corresponding to the initial position of the fiber. The video pattern is processed to separate the line and frame pulses from the video signal. The number of line scans is then counted starting from the frame pulse until the fiber is detected. This count is then converted to an analog voltage, filtered, and sent onto a control computer. Filtering the output is necessary due to fiber vibrations, which can be quite large at times (the tension gauge is located at the midpoint of the fiber span and may be affected with various vibrations including building and apparatus oscillations as well as some other fundamental fiber vibrations). The output of the gauge is an analog voltage, and the tension is determined by using the difference between the signal when the flow of gas to the jet is "on" versus "off". Typical "noise" on the system is 0.02 to 0.03 volts and 1 mm of fiber displacement results in a difference of approximately 1 volt.

Figure 6:
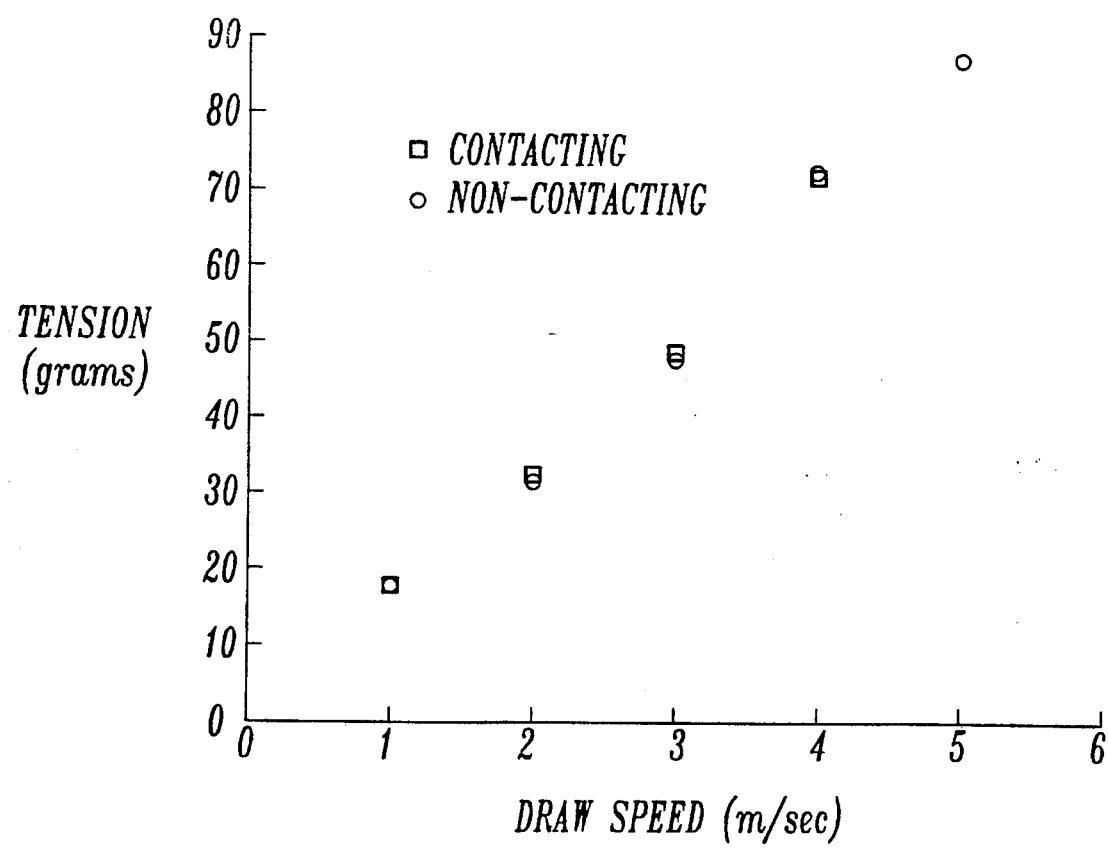
FIG. 6 is a plot of draw speed in m/sec. versus fiber tension in grams.

To calibrate the contactless measuring gauge, a fiber was drawn and the actual tension was measured using a 3-wheel strain gauge at several draw speeds. Next, with the set-up shown in FIG. 2 and using gas flow with a velocity of about 15 m/s, the constant, k, was determined to be 17.3 gm-volts. Another length of a fiber was then drawn and the tension and displacement were measured by contactless method according to the invention as a function of draw speed. The tension was determined by using a difference between an analog voltage signal when the flow of the gas jet was "on" versus "off". In FIG. 6 is shown the plot of the measured tension of this run and the tension calculated from the displacement data. It can be seen that the non-contacting tension measurement is accurate and varies from the "actual" tension by 1 gm or less. No actual (contacting) tension measurement was made at draw (or line) speed of 5 m/s as the fiber broke when the wheels of the strain wheel gauge contacted the fiber.

We claim:

1. A method of monitoring the tension in a moving fiber, comprising the steps of:
   a) determining an initial position of an optical fiber moving in a vertical direction at a certain velocity,
   b) applying a gas jet onto a section of said optical fiber in a direction transverse to the direction of movement of the fiber so as to cause deflection of the moving fiber from said initial position and axially of the gas jet, said gas being inert with respect to the composition of the fiber,
   c) sensing the magnitude of deflection of the fiber relative to the said initial position, and
   d) depending on the magnitude of deflection, adjusting the tension in the fiber so as to cause the change in the magnitude of deflection to a preselected value corresponding to the desired tension.

2. The method of claim 1, in which the said fiber is an optical fiber being drawn from a heated preform, and the tension is adjusted by adjusting the temperature of a fiber-drawing furnace to a value resulting in a desired tension.

3. The method of claim 1, in which said gas jet impinges upon a central section of a length of a moving optical fiber.

4. The method of claim 3, in which said length is a distance between a necking portion of a preform from which said fiber is drawn and an entry to a polymer coating device.

5. The method of claim 1, in which the cross-section of said gas jet ranges from 0.1 to 2 square inches.

6. The method of claim 5, in which the cross-section of said gas jet ranges from 0.1 to one square inch.

7. The method of claim 6, in which the cross-section of said gas jet is 0.125 square inches.

8. The method of claim 1, in which said deflection as measured at said central portion of the fiber is limited to 2 mm from the normal, undeflected position of the fiber.

9. The method of claim 8, in which said deflection is preferably 1 mm or less.

10. The method of claim 1, in which said gas impinges on the fiber at gas velocity ranging from 4 m/s to 100 m/s.

11. The method of claim 10, in which said gas velocity is about 20 m/sec.

12. The method of claim 10, in which the flow of gas is ramped to a desired gas velocity in a period of from 5 to 15 seconds.

13. The method of claim 10, in which said ramping period is about 10 seconds.

14. The method of claim 1, in which the deflection of the fiber is sensed optically.

15. The method of claim 14, in which the deflection is sensed by illuminating the fiber and sensing the location of its shadow relative to a preselected neutral position.

16. The method of claim 15, in which the location of the fiber's shadow is sensed on a linear array of photodiodes, positioned perpendicularly to the direction of movement of the fiber and at 90° to the direction of the gas jet.

17. The method of claim 15, in which said illuminating is conducted by a source selected from an incandescent light source and a laser.

18. Apparatus for monitoring tension in a moving fiber being drawn from a heated preform, which comprises:
 a) means for directing a gas jet onto a section of a vertically moving optical fiber in a direction transverse to the direction of movement of the fiber so as to case deflection of the moving fiber axially of the jet,
 b) means for sensing the magnitude of deflection of the fiber relative to the vertical direction of the movement, and
 c) means for adjusting the temperature of the furnace in response to the magnitude of deflection so as to change the deflection to a value corresponding to a desired tension.

* * * * *